(12) United States Patent
Tsai et al.

(10) Patent No.: US 6,637,098 B2
(45) Date of Patent: Oct. 28, 2003

(54) WASTE FLUORESCENT LAMP DISMANTLING APPARATUS

(75) Inventors: Hsien-Kun Tsai, Hsinchu (TW); Fong-Ru Yang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 10 days.

(21) Appl. No.: 10/029,964

(22) Filed: Dec. 31, 2001

(65) Prior Publication Data

US 2003/0121137 A1 Jul. 3, 2003

(51) Int. Cl.$^7$ .............................. B23P 19/00; B23Q 1/00
(52) U.S. Cl. ............................ 29/762; 29/801; 29/283.5
(58) Field of Search ....................... 29/762, 801, 283.5, 29/403.1, 403.3, DIG. 44; 266/148; 75/406; 313/624

(56) References Cited

FOREIGN PATENT DOCUMENTS

| JP | 02001081449 | * | 3/2001 |
| JP | 1245687 | * | 10/2002 |

* cited by examiner

*Primary Examiner*—John C. Hong
(74) *Attorney, Agent, or Firm*—Birch, Stewart, Kolasch & Birch, LLP

(57) ABSTRACT

A waste fluorescent lamp dismantling method and apparatus is set up to clamp two ends of a waste fluorescent lamp adjacent to its aluminum caps, and to maintain an airtight seal between the clamp sections and the aluminum caps, so that when the aluminum caps at two ends are separated from the waste fluorescent lamp, the gas and vapor in the lamp tube will be prevented from escaping. This apparatus and method can rapidly process waste fluorescent lamps while also conforming to environmental protection requirements.

22 Claims, 8 Drawing Sheets

WASTE FLUORESCENT LAMP DISMANTLING APPARATUS

FIELD OF THE INVENTION

The invention relates to a waste fluorescent lamp dismantling method and apparatus for dismantling waste fluorescent lamps, and particularly a method and apparatus that conforms to environmental protection requirements and is capable of rapidly dismantling waste fluorescent lamps.

BACKGROUND OF THE INVENTION

Fluorescent lamps are the most widely used lighting devices nowadays. They can be found almost ubiquitously in all kinds of places where lighting is needed, such as factories, offices and residences. In recent years, the growing awareness of environmental protection and conservation has made recycling and recovering of wastes a high priority issue around the world. The process and treatment of the huge amount of waste fluorescent lamps has also become an important concern.

Fluorescent lamps mainly consist of a lamp tube, aluminum caps and brass wires located therein, with mercury vapor and fluorescent powders contained in the lamp tube. During the recycling and recovery process, the aluminum caps should be separated from the lamp tube, and mercury vapor should be prevented from leaking or escaping into the atmosphere during the separation process. Hence, the process should be done in a vacuum environment.

The contemporary processing methods mostly involve disposing the fluorescent lamps in a vacuum chamber. Air is drawn out of the vacuum chamber to create pressure inside the chamber, and the fluorescent lamps are crushed and separated in the chamber. Such processing facilities have very high manufacturing and operating costs. Moreover, it is difficult to separate the aluminum caps and brass wires from the crushed lamp tubes. Hence, some present commercially adopted techniques employ flame cutting to sever and separate the aluminum caps. While such methods may separate the aluminum caps from the lamp tubes rapidly, they unavoidably cut off a portion of the lamp tubes along with the aluminum caps, resulting in waste. Furthermore, flame cutting consumes a lot of energy, and thus is not widely accepted.

There are some new separation techniques being proposed and developed suggesting crushing the fluorescent lamps in a vacuum tank by means of high pressure water. Mercury vapor and fluorescent powders are not released into the atmosphere, but are directly dissolved in the water. The another prior art proposes to crush the fluorescent lamps in a vacuum tank, then heat the crushed materials to 350 degrees Celsius to recover the mercury vapor.

Although the foregoing separation techniques are different from the conventional methods, because of environmental protection concerns they still have to take place in a vacuum environment to prevent mercury vapor from escaping into the atmosphere. Hence, they still have relatively high equipment costs, and the lamp tubes and aluminum caps also cannot be separated rapidly, The problems of recycling and reclaiming persist.

SUMMARY OF THE INVENTION

The primary object of the invention is to provide a waste fluorescent lamp dismantling method and apparatus to resolve the foregoing disadvantages, and to separate the aluminum caps from the lamp tubes quickly and effectively.

Another object of the invention is to provide a partial vacuum means of collecting mercury vapor, to thereby greatly reduce equipment costs.

The waste fluorescent lamp dismantling method and apparatus according to the invention is to clamp two ends of the fluorescent lamp adjacent to the aluminum caps, and to form an airtight seal between the clamp locations and the aluminum caps. Then turn the aluminum caps at the clamp location to separate the aluminum caps from the lamp tube. This apparatus consumes less energy, and in order to meet environmental protection requirements, a vacuum is created only between the clamp locations and aluminum caps, When the aluminum caps are being removed, the mercury vapor is collected to prevent it from escaping into the atmosphere. As the invention employs a partial vacuum around the aluminum caps, equipment costs may be greatly reduced.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
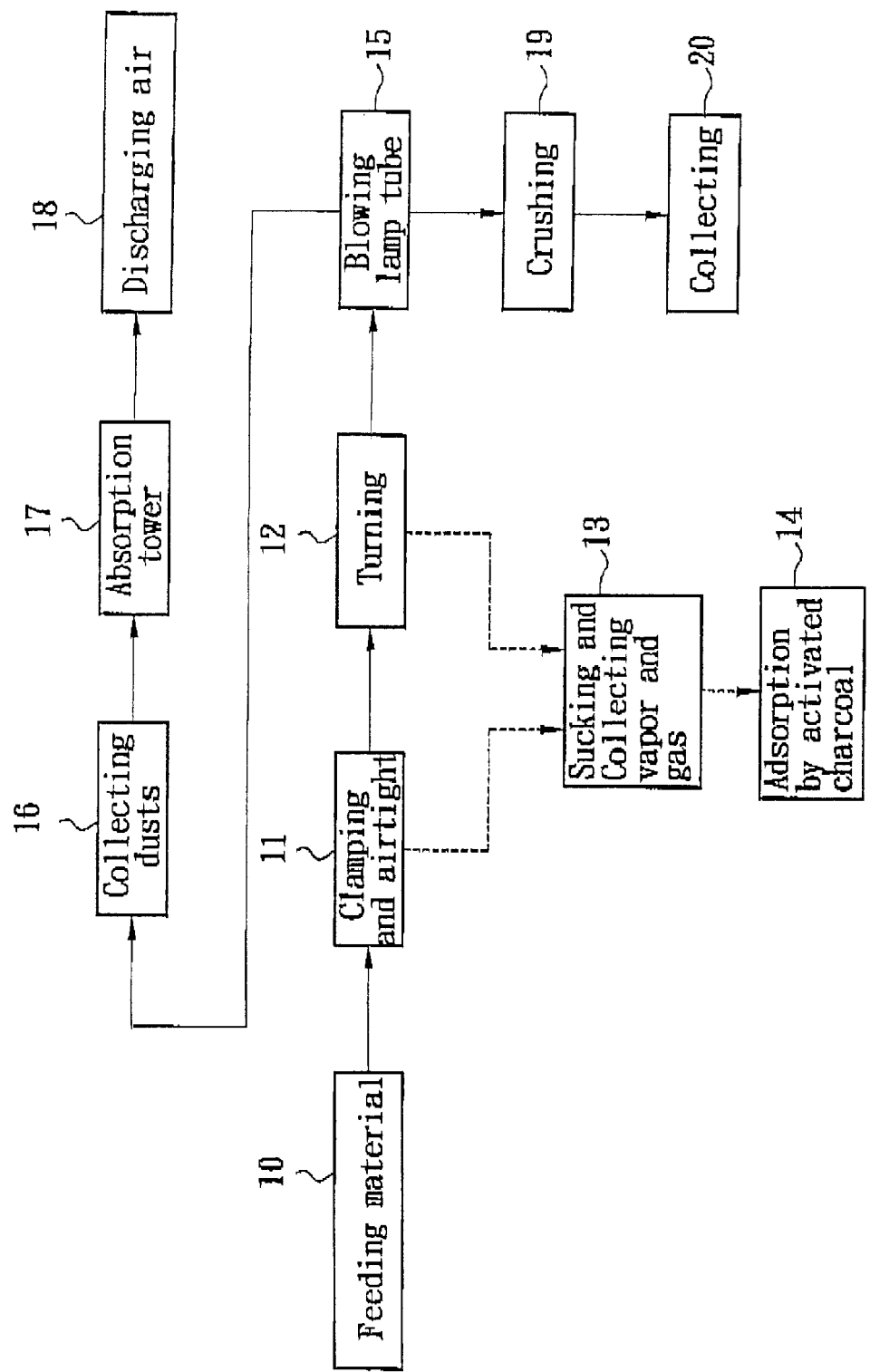
FIG. 1 is a process flow chart of the invention.
Figure 2:
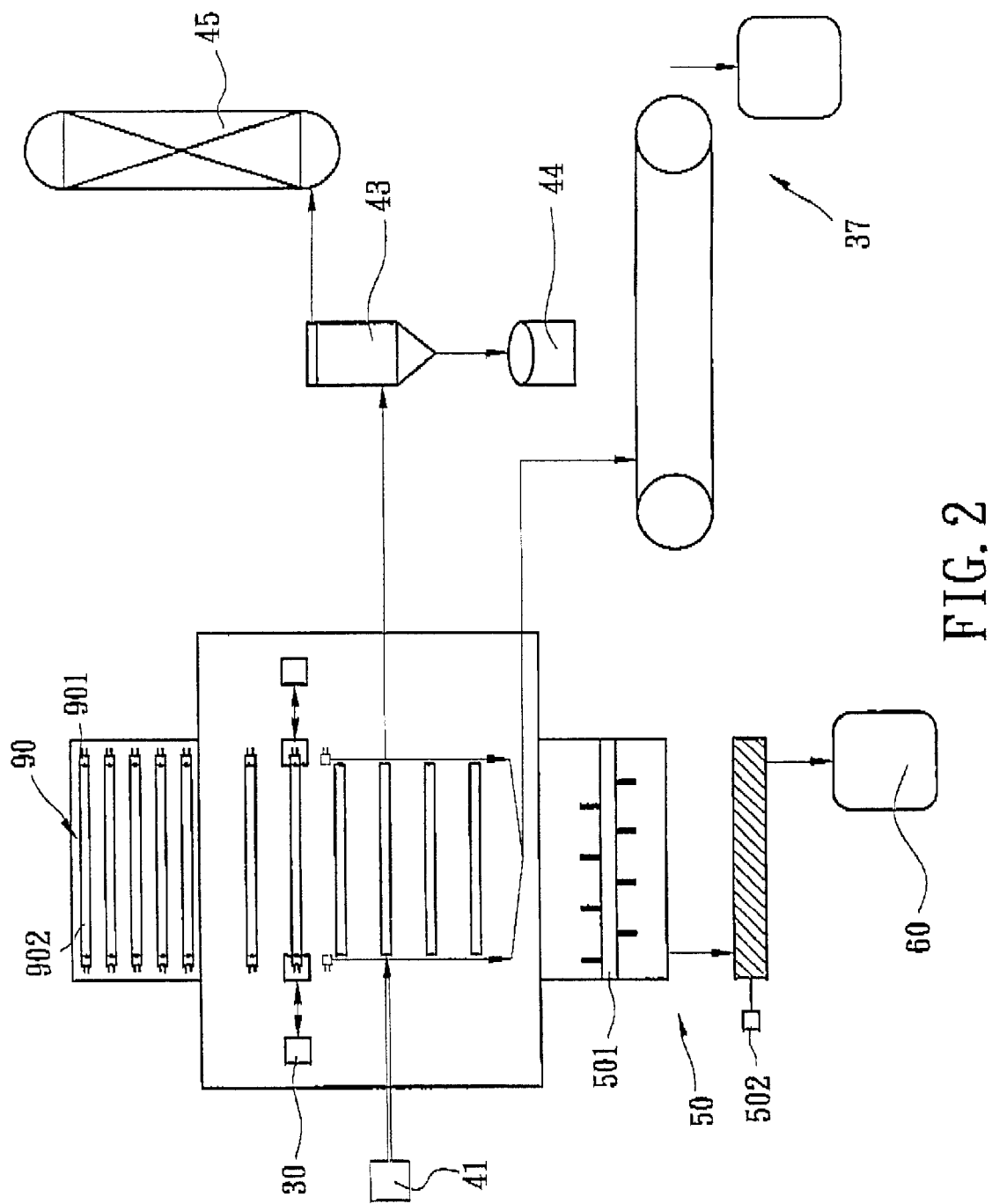
FIG. 2 is a schematic view of the invention.

Referring to FIGS. 1 and 2, die waste fluorescent lamp dismantling method and apparatus according to the invention is for dismantling waste fluorescent lamps 90. Each of the waste fluorescent lamps 90 consists of a lamp tube 902 and aluminum caps 901 located at two ends of the lamp tube 902. The method is initiated by feeding material (step 10), loading the waste fluorescent lamps 90, then using an aluminum cap separation mechanism 30 to clamp two ends of the waste fluorescent lamp 90 adjacent to the aluminum caps 901 to maintain an airtight seal (step 11). Then remove and separate the aluminum caps 901 by turning (step 12), and in the mean time, reclaim by suction (step 13) the vapor and gas contained in die waste fluorescent lamp 90 (such as mercury vapor) through adsorption by using activated charcoal (step 14).

The separated aluminum caps 901 are collected and recycled by an aluminum cap collection unit 37. The powder in the lamp tubes 902 is cleared and removed through a swirling air flow generated by a nozzle 41 (step 15) of an air pipe, and then collected by a dust collection unit 43 (step 16) and accumulated in a dust collection tank 44. The remainder of the powder or dust that is not collectable is drawn into an absorption tower 45 (step 17) for absorption, and the resulting clean air is discharged out, Hence, there are no environmental pollution concerns. The lamp tubes 902 with the powder removed are crushed (step 19) and collected by a collection tank 60 (step 20).

Figure 3:
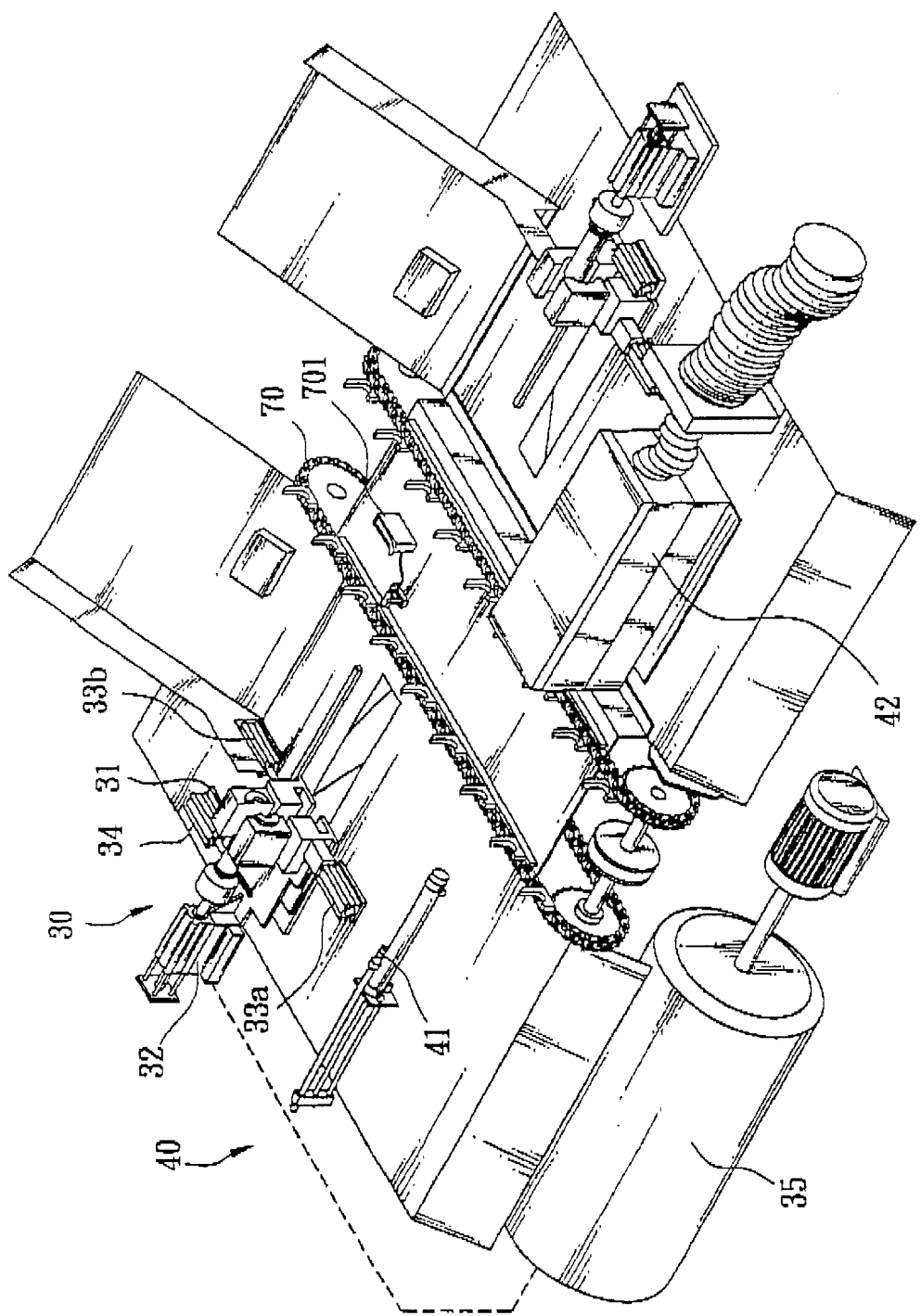
FIG. 3 is a schematic structure of the invention.

Referring to FIG. 3, the apparatus according to the invention consists of a conveyor mechanism 70, an aluminum cap separation mechanism 30, a powder removing mechanism 40, a lamp tube crush unit 50 and a collection tank 60 (also shown in FIG. 2). The conveyor mechanism 70 is to transport the waste fluorescent lamps 90 to the other mechanisms. The aluminum cap separation mechanism 30 is to separate the aluminum caps 901 from the lamp tubes 902 and to collect tie vapor and gas in the lamp tubes 902, The powder removing mechanism 40 is to remove the powder and dust from the lamp tubes 902. The lamp tube crush unit 50 is to crush the lamp tubes 902 after the powder and dust has been removed (including a coarse crush unit 501 and a fine crush unit 502). Then the crushed material is collected by the collection tank 60.

Figure 4:
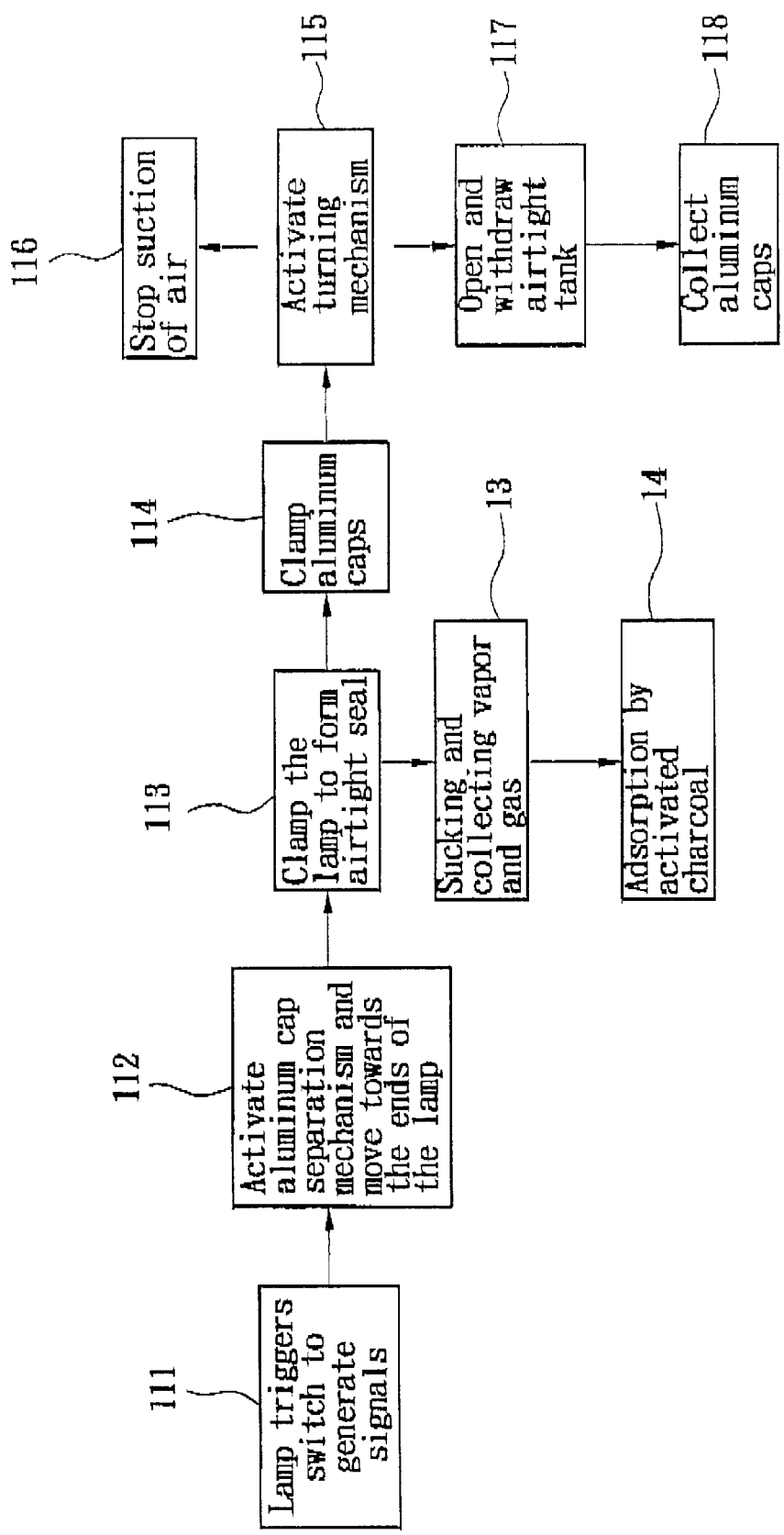
FIG. 4 is a process flow chart of the aluminum cap separation mechanism.
Figure 5:
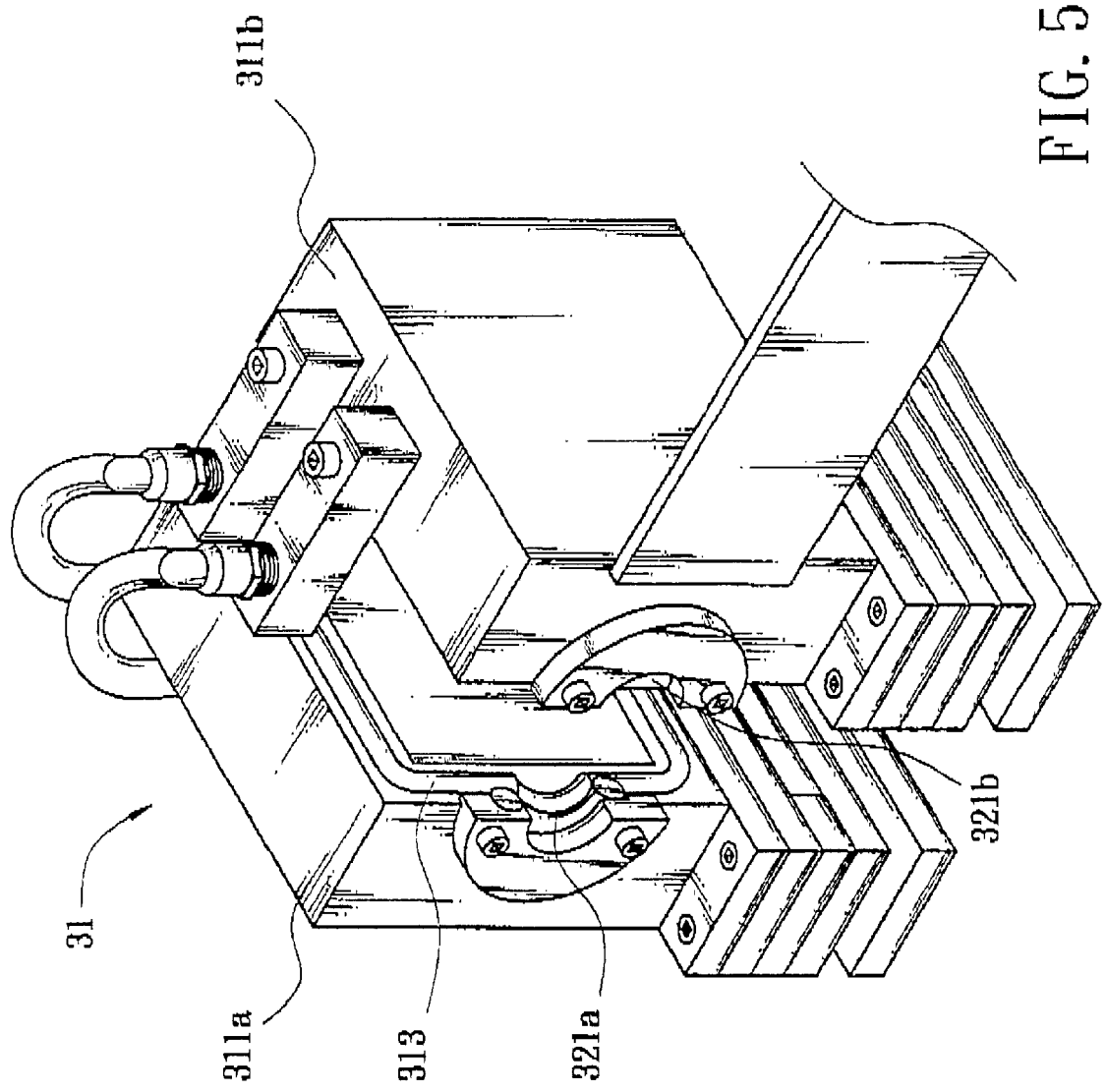
FIG. 5 is a schematic view of an airtight tank of the invention.

Referring to FIG. 4 for the processes of the aluminum cap separation mechanism 30, the waste fluorescent lamps 90 are first transported by the conveyor mechanism 70 to the alumni cap separation mechanism 30, The conveyor mechanism 70 may be a chain with corresponding hooks 702 disposed thereon (shown in FIG. 9). The hooks 702 have a larger diameter than the outside diameter of the lamp tubes 902 to facilitate transportation of the waste fluorescent lamps 90. The moving lamp tube 902 will trigger a sensor 701 to generate a signal (step 111) for activating the aluminum cap separation mechanism 30 to move towards the ends of the lamp tube 902 (step 112). Air cylinders 32 located at two ends will be activated to move the aluminum cap separation mechanism 30 inwards and then clamp the lamp tube 902 to form an airtight seal (step 113), In other words, air cylinders 33a and 33b push an airtight tank 31 inwards to clamp the waste fluorescent lamp 90, and to maintain an air tight seal between the clamp section and the aluminum caps 901. Referring to FIG. 5, the airtight tank 31 includes two corresponding casings 311a and 311b to form an airtight chamber. The casings 311a and 311b have respectively a concave opening 321a and 321b to form the clamp section. In order to maintain the airtight seal, the peripheral rims of the casings 311a and 311b and their concave openings 321a and 321b are bonded with an airtight layer 313 of material such as rubber or the like.

Figure 6:
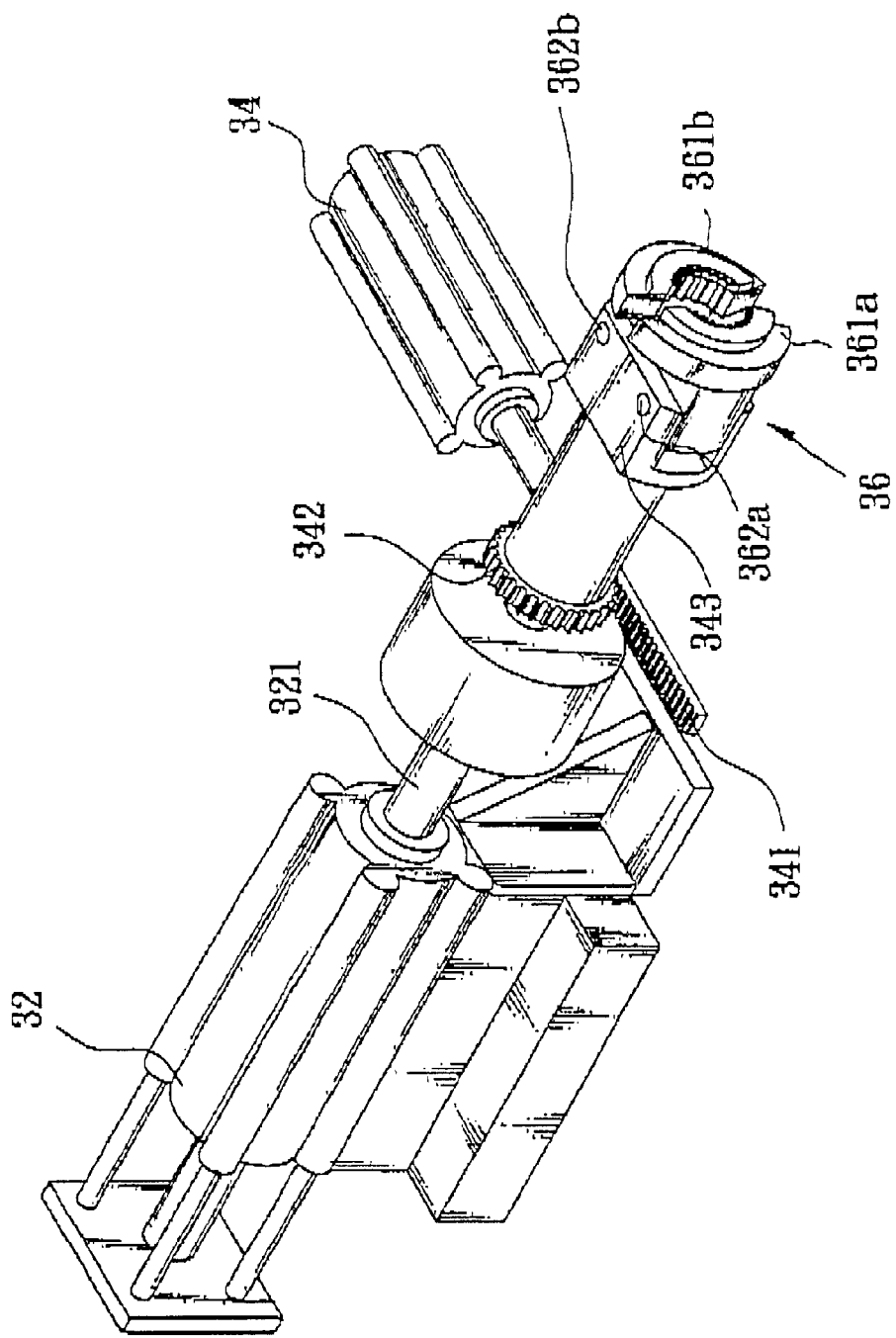
FIG. 6 is a schematic view of the aluminum cap separation mechanism.
Figure 7:
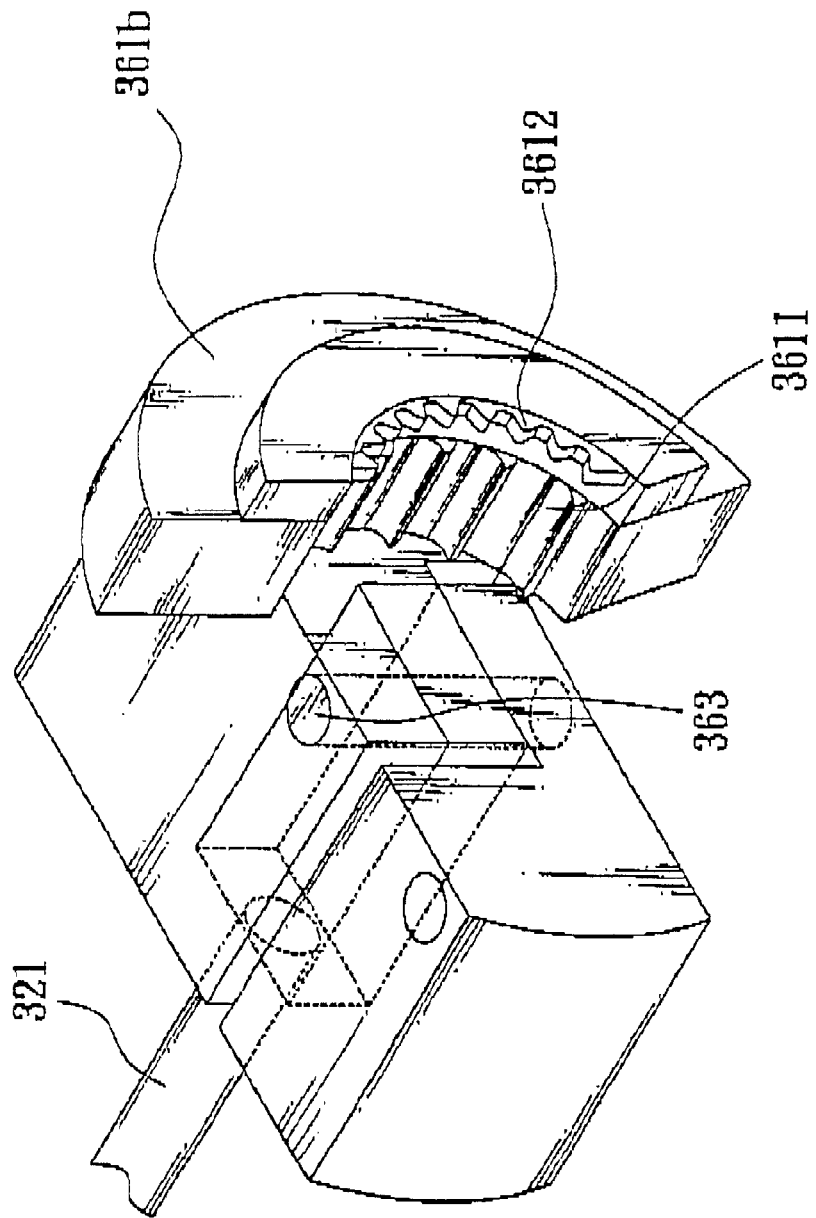
FIG. 7 is a schematic view of a clamp unit of the invention.
Figure 8:
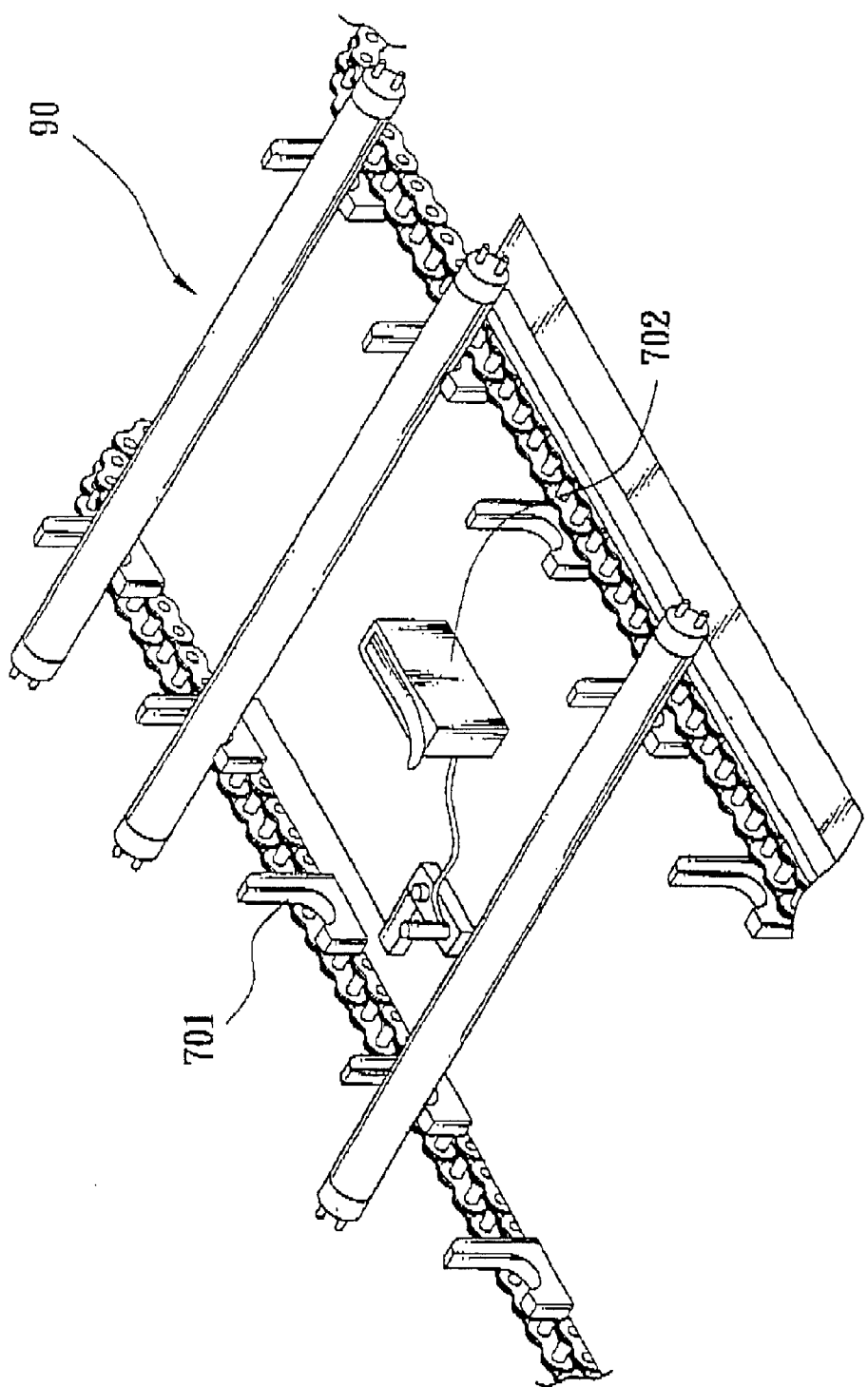
FIG. 8 is a schematic view of a conveyor and hooks of the invention.

The clamp unit 36 is then employed to tightly clamp the aluminum caps 901 (step 114), as shown in FIG. 6. Through the rearward movement of an air cylinder 32, the spindle 321 will be moved rearwards. The clamp unit 36 has two clamp sections 361a and 361b whose centers do not pivotally engage with the pivotal point 363 of the spindle 321. Instead, the clamp sections 361a and 361b have respectively an outer rim pivotally engaged with pivotal points 362a and 362b located in a yoke 343. Hence, when the spindle 321 is moved rearwards by the air cylinder 32, the pivotal point 363 will also be moved rearwards, and the clamp sections 361a and 361b will move inwards toward each other around the pivotal points 362a and 362b, such that an aluminum cap chuck 3611 located on the clamp sections 361a and 361b (only the chuck on the clamp section 361b is shown) will securely clamp the aluminum cap 901 of the waste lamp 90.

At this stage, the airtight tank 31 maintains an airtight seal. A vacuum pump 35 provides negative pressure under normal conditions, so that when the vacuum valve (not shown in the drawings) of the airtight tank is opened, airtight conditions can be rapidly attained. Thereby, mercury vapor in the lamp tube 902 will not escape. A turning mechanism is then activated (step 115), and another air cylinder 34 is used to drive a gear rack 41, which in turn drives a coupled gear 342 to turn the clamp unit 36. The clamp 36 has knife blade edges 3612 located at the front end thereof to cut off the aluminum cap 901 along the juncture of the aluminum cap 901 and lamp tube 902. The knife blade edges 3612 may be made of metal or diamond.

The suction of the air is then stopped (step 116), the airtight tank 31 is opened and withdrawn (step 117), and the aluminum cap collection unit 37 is used to collect the separated aluminum cap 901 (step 118), The lamp tube 902 is then transported to the powder removing mechanism 40, which has a nozzle 41 and a collection sleeve 42 respectively connecting two ends of the lamp tube 902. The nozzle 41 is tapered, has a narrower front end, and may be inserted completely into the lamp tube 902. One end is used to inject air and the other end is used to suck air for removing the powder and dust contained in the lamp tube 902. The removed powder and dust is collected by the dust collection unit 43 and then transferred to the dust collection tank 44 for accumulation. The remaining powder and dust that is not collectable is absorbed in the absorption tower 45. The resulting clean air is discharged out. Hence, there are no environmental pollution problems or concerns. The powders removed lamp tubes 902 are then crushed by a coarse crush unit 501 and a fine crush unit 502 to become fine debris, and are delivered to the collection tank 60.

The invention can clamp two ends of the fluorescent lamp at selected locations adjacent to the aluminum caps, and forms an airtight seal between the clamp sections and aluminum caps. The clamped sections are then turned to cut off and separate the aluminum caps from the lamp tube along the junctures between them. This whole process consumes far less energy than conventional disposal methods. Furthermore, in order to reclaim mercury vapor to conform to environmental protection requirements, the aluminum cap portions of the waste fluorescent lamps are made partially airtight when the aluminum caps are being severed and separated. The mercury vapor may then be collected by suction to prevent leaking. This process is done under partial vacuum conditions around the aluminum caps section, and can greatly reduce equipment costs.

While the preferred embodiments of the invention have been set forth for the purpose of disclosure, modifications of the disclosed embodiments of the invention as well as other embodiment thereof may occur to those skilled in the art. Accordingly, the appended claims are intended to cover all embodiments which do not depart from the spirit and scope of the invention.

What is claimed is:

1. A waste fluorescent lamp dismantling apparatus for dismantling waste fluorescent lamps each having a lamp tube and two aluminum caps located at two ends thereof, the apparatus comprising at least:

an aluminum cap separation mechanism including a pair of clamp units and a pair of clamp sections for clamping the waste fluorescent lamp at selected locations adjacent the aluminum caps, the portion between the clamp locations and the aluminum caps being maintained at an airtight condition, and the clamp units being used to clamp the aluminum caps and to turn relatively against the lamp tube for separating the aluminum caps from the lamp tube;

a powder removing mechanism including a nozzle engageable with one end of the lamp tube which has the aluminum cap removed for injecting air to remove powders in the lamp tube; and a collection tank for collecting the lamp tube after the powders being removed.

2. The waste fluorescent lamp tube dismantling apparatus of claim 1, further comprising a conveyor mechanism for transporting the waste fluorescent lamps to various mechanisms.

3. The waste fluorescent lamp tube dismantling apparatus of claim 2, wherein the conveyor mechanism is a belt conveyor having hooks disposed thereon.

4. The waste fluorescent lamp tube dismantling apparatus of claim 3, wherein the hooks have a diameter greater than the diameter of the lamp tube.

5. The waste fluorescent lamp tube dismantling apparatus of claim 2, wherein the conveyor mechanism is a belt conveyor driven by chains.

6. The waste fluorescent lamp tube dismantling apparatus of claim 1, wherein the aluminum cap separation mechanism includes a pair of airtight tanks, each of the airtight tanks having two matching casings for encasing the clamp unit.

7. The waste fluorescent lamp tube dismantling apparatus of claim 6, wherein the two casings have respectively a concave opening for forming the clamp sections to clamp the waste fluorescent lamp when the two casings are engaged tightly with each other.

8. The waste fluorescent lamp tube dismantling apparatus of claim 7, wherein the two casings and the clamp sections have an airtight layer at the peripheral rims thereof to allow sections between the clamp sections and the aluminum caps maintaining an airtight condition.

9. The waste fluorescent lamp tube dismantling apparatus of claim 6, wherein each of the airtight tanks further includes a vacuum valve for collecting gas in the waste fluorescent lamp when the aluminum caps are separating.

10. The waste fluorescent lamp tube dismantling apparatus of claim 9, wherein the gas is collected by adsorption through active charcoal.

11. The waste fluorescent lamp tube dismantling apparatus of claim 1, wherein the clamp unit clamping the aluminum caps and turning relatively against the lamp tube is accompanied by using knife blade edges located at a front end of the clamp unit to sever the aluminum cap along the juncture of the aluminum cap and the lamp tube for separating the aluminum caps from the lamp tube.

12. The waste fluorescent lamp tube dismantling apparatus of claim 11, wherein the two aluminum caps are turned at opposite directions against the lamp tube.

13. The waste fluorescent lamp tube dismantling apparatus of claim 11, wherein the aluminum cap separation mechanism further includes a collection tank for collecting the severed aluminum caps.

14. The waste fluorescent lamp tube dismantling apparatus of claim 11, wherein the knife blade edges are made of metal.

15. The waste fluorescent lamp tube dismantling apparatus of claim 11, wherein the knife blade edges are made of diamond.

16. The waste fluorescent lamp tube dismantling apparatus of claim 11, wherein the clamp unit has a teeth structure to couple with a gear rack, the gear rack being movable to drive and turn the clamp unit.

17. The waste fluorescent lamp tube dismantling apparatus of claim 1, wherein the powder removing mechanism further includes a collection sleeve to engage with another end of the lamp tube for collecting powders removed by the nozzle.

18. The waste fluorescent lamp tube dismantling apparatus of claim 17, wherein the powder removing mechanism further includes a dust collection device connecting to the collection sleeve for storing the powders collected by the collection sleeve.

19. The waste fluorescent lamp tube dismantling apparatus of claim 18, wherein the dust collection device is to separate and collect fluorescent powders from the powders.

20. The waste fluorescent lamp tube dismantling apparatus of claim 19, wherein the powder removing mechanism further includes a absorption tower for collecting and processing the powders which do not include the fluorescent powders.

21. The waste fluorescent lamp tube dismantling apparatus of claim 1, wherein the nozzle is tapered and has a narrower front end insertable into the lamp tube.

22. The waste fluorescent tamp tube dismantling apparatus of claim 1 further comprising a lamp tube crush unit for crushing the lamp tube after the powders having been removed, the crushed lamp tube being transported to the collection tank for collection.

* * * * *